(12) United States Patent
Lin et al.

(10) Patent No.: US 6,816,652 B1
(45) Date of Patent: Nov. 9, 2004

(54) PUMP FIBER BUNDLE COUPLER FOR DOUBLE-CLAD FIBER DEVICES

(75) Inventors: Hong Lin, Palo Alto, CA (US); Claire Yan Chen Lin, Palo Alto, CA (US)

(73) Assignee: Calmar Optcom, Inc., Sunnyvale, CA (US)

(*) Notice: Subject to any disclaimer, the term of this patent is extended or adjusted under 35 U.S.C. 154(b) by 178 days.

(21) Appl. No.: 09/813,445

(22) Filed: Mar. 20, 2001

Related U.S. Application Data

(60) Provisional application No. 60/190,728, filed on Mar. 20, 2000.

(51) Int. Cl.[7] .................................................. G02B 6/26
(52) U.S. Cl. ........................................... 385/39; 385/51
(58) Field of Search ............................... 385/39, 51, 54, 385/44, 45, 46, 73, 74

(56) References Cited

U.S. PATENT DOCUMENTS

| | | | |
|---|---|---|---|
| 5,016,963 A | * | 5/1991 | Pan ........................ 350/96.18 |
| 5,323,404 A | | 6/1994 | Grubb |
| 5,815,518 A | | 9/1998 | Reed et al. |
| 5,864,644 A | | 1/1999 | DiGiovanni et al. |
| 5,966,480 A | | 10/1999 | LeGrange et al. |

* cited by examiner

*Primary Examiner*—Frank G. Font
*Assistant Examiner*—Michael P. Mooney
(74) *Attorney, Agent, or Firm*—Fish & Richardson P.C.

(57) ABSTRACT

Techniques and devices that couple multiple pump fibers to a double-clad fiber by using a sleeve, a lens, an input fiber ferrule, and an output fiber ferrule.

24 Claims, 3 Drawing Sheets

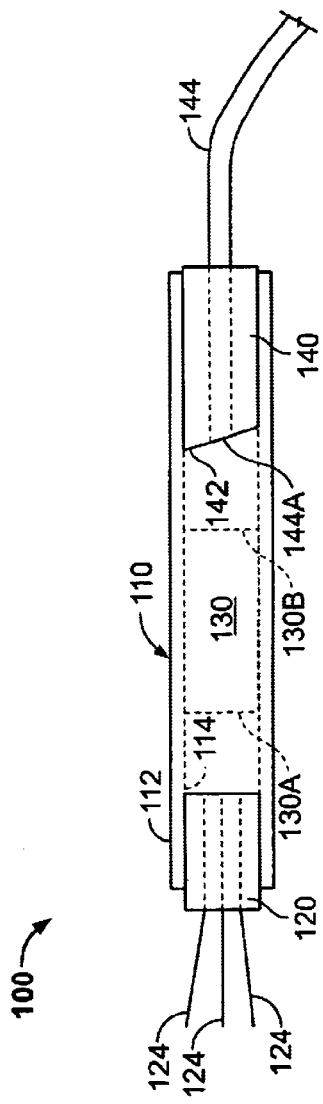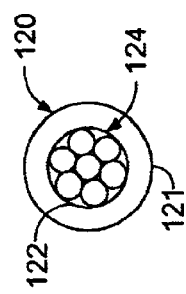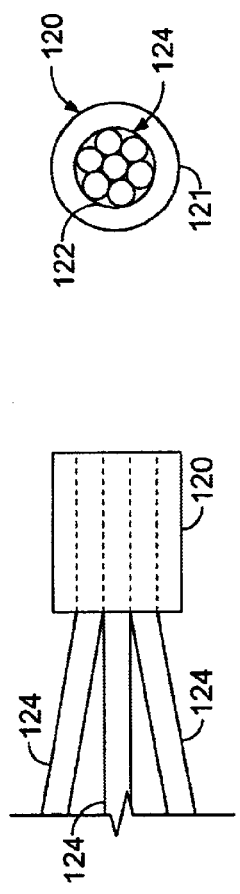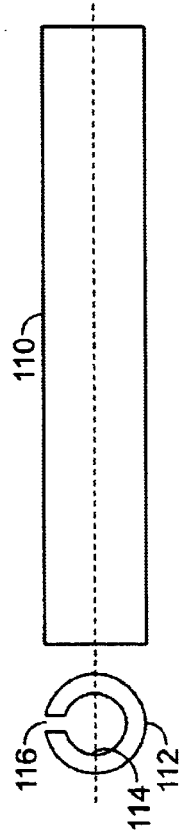

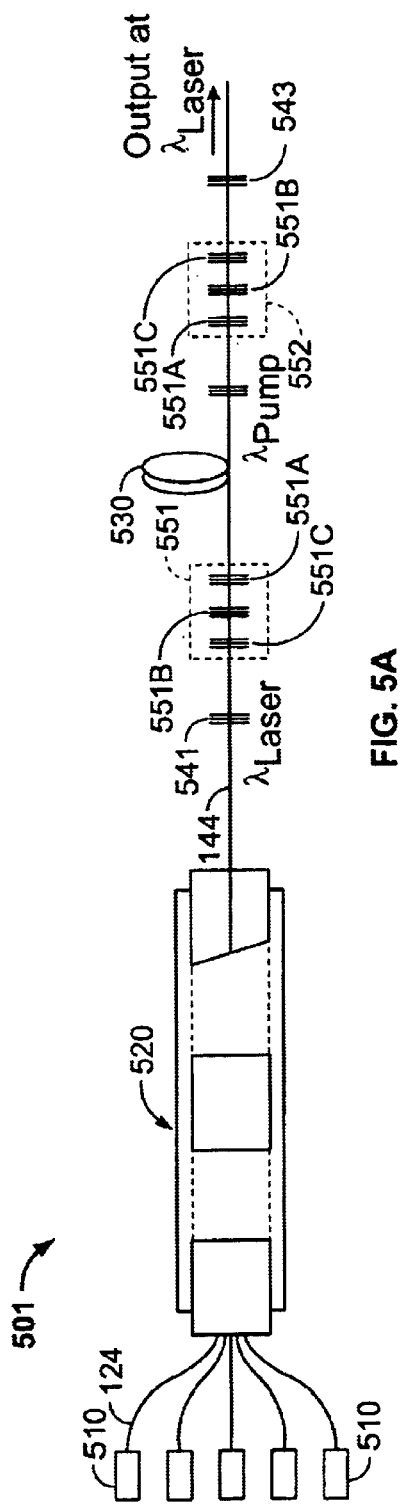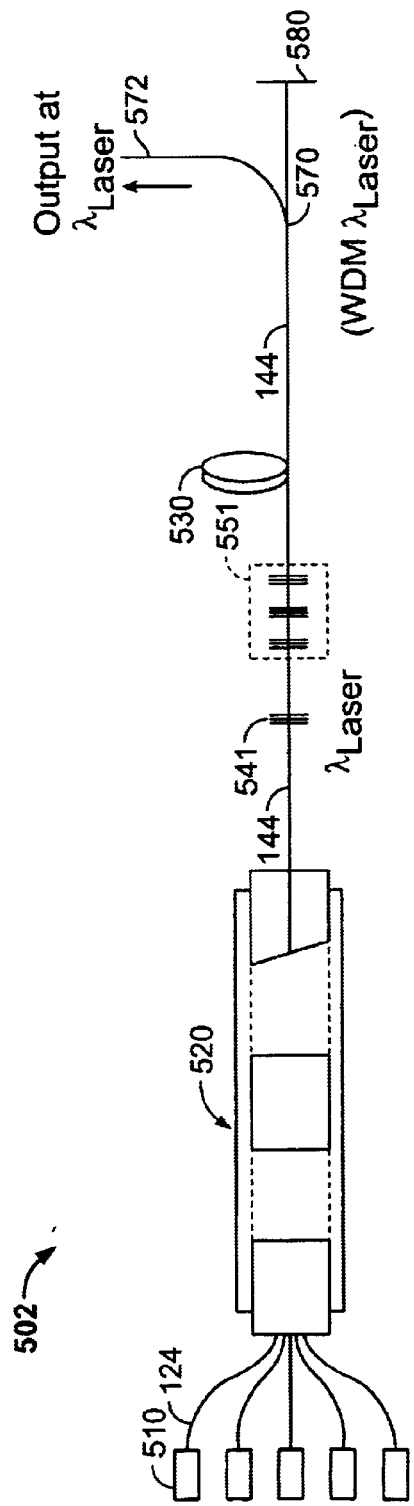
FIG. 5A
FIG. 5B

PUMP FIBER BUNDLE COUPLER FOR DOUBLE-CLAD FIBER DEVICES

This application claims the benefit of U.S. Provisional Application No. 60/190,728, filed on Mar. 20, 2000.

BACKGROUND

This application relates to optical fiber devices, and more specifically, to techniques for coupling optical pump light into a double-clad fiber device.

An optical fiber may be designed to operate as an optical gain medium. In general, the core of such an optical fiber may be doped with certain active ions such as erbium and other rare earth ions to produce the desired optical gain by receiving optical pump light at a desired pump wavelength. Hence, when optically pumped at the pump wavelength (e.g., near 0.98 micron), the doped fiber core absorbs the pump light to produce light at an emission wavelength different from the pump wavelength (e.g., near 1.55 micron). Such a doped fiber may be used to form various fiber devices, including but not limited to, a fiber laser for producing a laser at the emission wavelength and a fiber optical amplifier to amplify an optical signal at the emission wavelength.

The pump beam may be directly coupled into the core of a doped fiber from one end facet of the fiber. Under this mode of pump coupling, when a single-mode fiber is used as the gain medium, the pump light should be a single-mode beam in order to be coupled into the fiber core in the direct pump coupling scheme. Hence, a single-mode laser source may be needed to produce the single-mode beam. This requirement can limit the amount of the pump power coupled into the fiber core since many commercial single-mode lasers have limited output power. High-power multi-mode diodes and diode arrays, therefore, may not be used as the pump source in the direct pump coupling systems. In another aspect, since the single-mode fiber core has relatively small cross section area, the total amount of power should also be small so that the intensity does not exceed the laser damage threshold intensity of the fiber core.

Alternatively, a double-clad fiber may be used to indirectly couple the pump beam into the doped core. Such a double-clad fiber may include an inner cladding layer to surround the fiber core and has an index of refraction less than that of the fiber core. This inner cladding layer forms a cladding optical waveguide along the fiber that supports multiple modes and has a cross section area much greater than that of the fiber core to achieve a large numerical aperture. There may be least one outer cladding layer with an index of refraction less than that of the inner cladding layer formed outside the inner cladding layer. In operation, the pump light is first coupled into the inner cladding layer to propagate in the cladding waveguide along the fiber. The pump light in the inner cladding layer then interacts with the fiber core and is absorbed by the doped ions. Since the pump is coupled into the core through the fiber cladding, the double-clad fiber is also referred to as a cladding-pumped fiber.

In comparison to direct optical pumping into the fiber core, the cladding pumping can be more efficient since the pump light is coupled through the large cross section of the inner cladding layer. High-power multi-mode pump sources may now be used to produce pump light for the double-clad fiber devices. In addition, the absorption of the pump light by the fiber core is extended over the interface between the inner cladding layer and the fiber core. Therefore, the cladding-pumped fiber can achieve higher pump power in the fiber core than what is possible in a directly-pumped fiber, without exceeding the damage threshold intensity for the fiber core.

SUMMARY

This application includes techniques and devices that couple multiple pump fibers to a double-clad fiber by using a sleeve, a lens, an input fiber ferrule, and an output fiber ferrule. The sleeve has a tubular body with an input terminal and an output terminal. The pump fibers are bundled together by the input fiber ferrule to form a pump fiber bundle. End facets of bundled fiber terminals are polished to form an optical pump coupling surface for outputting pump light from the pump fibers. The double-clad fiber has a pump-receiving terminal which is engaged to the output fiber ferrule. The input and output fiber ferrules are respectively placed in the sleeve at the input and said output terminal. The lens is disposed in the sleeve between the input and said output fiber ferrules to image the optical pump coupling surface onto the pump-receiving terminal.

BRIEF DESCRIPTION OF THE DRAWINGS

FIG. 1 shows one embodiment of a pump fiber bundle coupler for coupling light from pump fibers into a double-clad fiber.

FIGS. 2A and 2B show a fiber bundle ferrule that engages the pump fibers to form a fiber bundle.

FIG. 3 shows one embodiment of a split sleeve used in the coupler in FIG. 1.

FIGS. 5A and 5B show exemplary fiber devices that use a pump fiber bundle coupler based on the design in FIG. 1 or FIG. 4.

DETAILED DESCRIPTION

Figure 4:
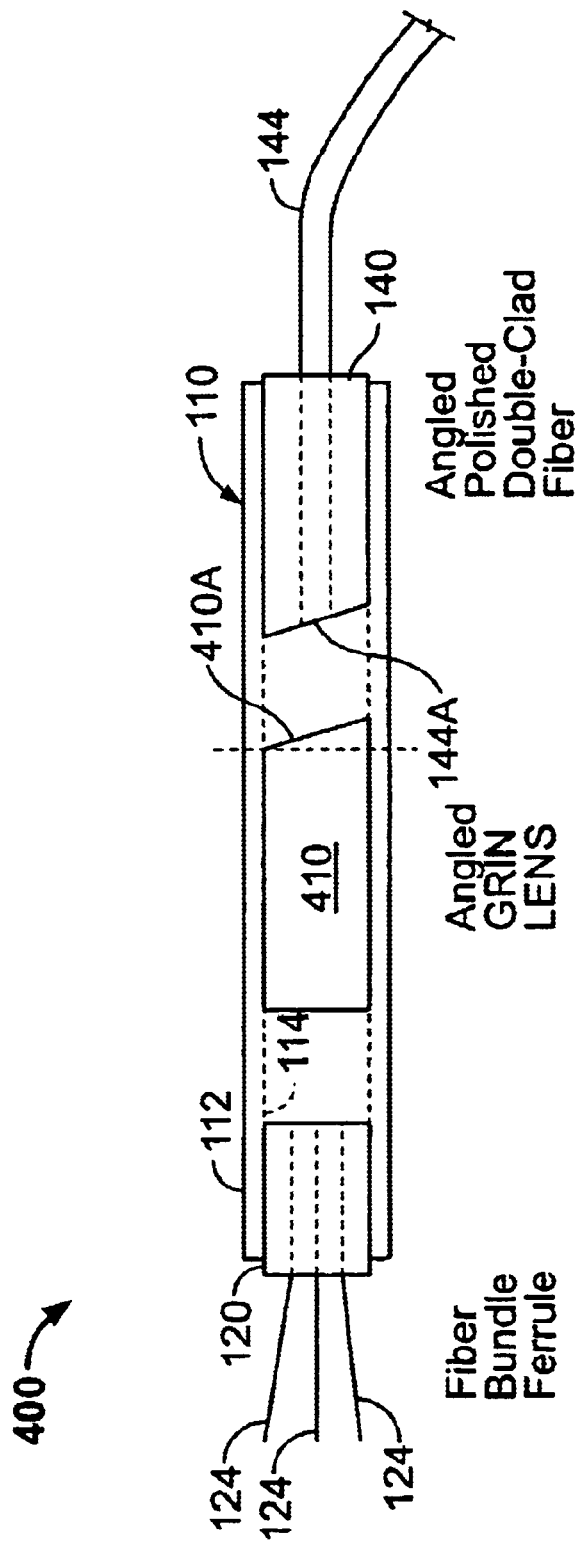
FIG. 4 shows another embodiment of a pump fiber bundle coupler for coupling light from pump fibers into a double-clad fiber.

FIG. 1 shows one embodiment of a pump fiber bundle coupler 100 that engages two or more pump fibers 124 to a double-clad fiber 144 without fiber fusion. The pump fibers 124 may be multi-mode fibers for transporting multi-mode, high-power pump beams to the double-clad fiber 144. The double-clad fiber 144 is a doped fiber and may be a single-mode fiber. A pump coupling lens 130 is placed between the pump fibers 124 and the double-clad fiber 144 to direct the pump beams from the pump fibers 124 into the double-clad fiber 144. The lens 130 may be any suitable lens such as a GRIN lens. A sleeve 110 with a tubular body is further provided to hold and align the pump fiber ferrule 120 with the pump fibers 124, the pump coupling lens 130, and the fiber ferrule 140 with the double-clad fiber 144 so that pump light from the pump fibers 124 can be focused by the lens 130 into the double-clad fiber 144.

The double-clad fiber 144 may include a fiber core doped with rare-earth ions as a laser gain medium for producing gain at an emission wavelength, an inner cladding layer surrounding the fiber core, and an outer cladding layer surrounding the inner cladding layer. Additional layers may also be formed outside the outer cladding layer. The fiber core and the inner cladding layer may be formed of glass materials such as silica. The outer cladding layer may be a low-index polymer material. In general, the cross section of the fiber core may be circular and the cross section of the inner cladding layer may be circular or non-circular. It is desirable that the respective refractive indices $n_c$, $n_{ic}$, and $n_{oc}$ of the core, the inner cladding layer, and the outer cladding layer satisfy a condition of $n_c > n_{ic} > n_{oc}$. Under this condition, the double-clad fiber 144 effectively has two optical waveguides. The first waveguide is formed of the fiber core and bounded by the inner cladding layer. This may be either a single-mode waveguide or a multi-mode waveguide. For many applications, the fiber core and the inner cladding layer may be designed to form a single-mode waveguide. The second waveguide is the cladding waveguide formed of the inner cladding layer and bounded by the outer cladding layer. The inner cladding layer may have a large cross section so that the second waveguide supports multiple modes. Accordingly, various pump sources, such as both single-mode and multi-mode lasers, especially multi-mode lasers with high output powers, may be used to provide pump light into inner cladding layer of the fiber 144.

In operation, once the pump light is properly coupled into the inner cladding layer, it is confined within the outer cladding layer and bounces back and forth by the interface between the inner and outer cladding layers to propagate along the fiber 144. The confined pump light becomes absorbed by the fiber core to excite the doped ions to produce the desired optical gain at the emission wavelength whenever it passes through the fiber core.

The pump fiber bundle coupler 100 uses a pump fiber ferrule 120 which has a tubular body to hold distal terminals of pump fibers 124 together to form a pump fiber bundle. The other distal terminals of the pump fibers 124 are coupled to pump light sources such as multi-mode diode lasers or diode laser arrays as shown in FIGS. 5A and 5B to receive pump light. A suitable adhesive such as epoxy may be used to bond the pump fibers and fix the bundled terminals of the fibers 124 to the interior of the pump fiber ferrule 120. The end facets of bundled terminals of the pump fibers 124 are polished to an optical finish. In addition, the end facets may be coated with an anti-reflective coating to reduce loss due to optical reflection.

FIGS. 2A and 2B show the side view and the cross section view of the pump fiber ferrule 120 engaged to the pump fibers 124, respectively. The pump fiber ferrule 120 may include a cylindrical exterior 121 and a cylindrical interior 122 that is substantially concentric with the exterior 121. The pump fibers 124 may be symmetrically arranged in the interior 122. As illustrated in FIG. 2B, seven pump fibers 124 may be held by the pump fiber ferrule 120 where one pump fiber is positioned in the center of the interior 122 and six pump fibers are positioned to form a circle around the center pump fiber.

A second tubular fiber ferrule 140 is provided to hold the end section of the double-clad fiber 144 for receiving the pump light from the pump fibers 124. The fiber ferrule 140 has an end facet 142 that is cut at an acute angle with respect to a plane perpendicular to the fiber 144 so that the end facet 144A of the fiber 144 is polished to form the same acute angle with respect to the plane perpendicular to the fiber 144. This is to reduce the optical reflection back to the fiber 144 which is usually undesirable for laser amplification. Alternatively, the end facet 142 of the fiber ferrule 140 may be perpendicular to the longitudinal direction of the fiber 144 and the fiber end facet 144A is polished to form the desired acute angle with respect to the plane perpendicular to the fiber 144.

The fiber ferrules 120 and 140 may be formed of a number of materials, including glass, quartz, metals such as stainless steel, or ceramics. Both fiber ferrules 120 and 140 are designed to have substantially the same exterior dimension so that when they are aligned to each other, the double-clad fiber 144 is approximately aligned to the center of the pump fibers 124. In addition, their exterior shape should conform to the interior of the sleeve 110.

Referring to FIG. 3, the sleeve 110 of the pump fiber bundle coupler 100 may have an elongated, rigid tubular body with a cylindrical exterior 112 and a cylindrical interior 114. The sleeve 110 may be a split sleeve in which a longitudinal slit 116 may be formed from one end to the other along the longitudinal direction of the sleeve 110. This slit 116 allows adjustment of relative positions of fiber ferrules 120, 140, and the lens 130 during assembly of the coupler 100. Various materials may be used for the sleeve 110, such as Zirconia or Phosphor Bronze.

As shown in FIG. 1, the fiber ferrule 120 is inserted into an input terminal of the sleeve 110 and the fiber ferrule 140 is inserted into an output terminal of the sleeve 110. The fiber ferrules 120 and 140 are spaced from each other so that the lens 130 may be inserted in the sleeve 110 between fiber ferrules 120 and 140 to couple the pump light from the pump fibers 124 into the double-clad fiber 144.

The exteriors of the fiber ferrules 120, 140 and the lens 130 are designed to substantially conform to the interior 114 of the sleeve 110. Therefore, once the fiber ferrules 120, 140 and the lens 130 are placed inside the sleeve 110, they tightly snug at their respect positions within the sleeve 110. The position of each of the fiber ferrules 120, 140 and the lens 130 may be adjusted by applying a force through the slit 116 to slide the lens 130 or a ferrule 120 or 140 along the sleeve 110.

Notably, the pump fiber coupler 100 is in a substantial concentric configuration where the center of the pump fibers, the center of the double-clad fiber 144 and the center of the lens 130 are substantially aligned along the optic axis of the lens 130 which is at the center of the cylindrical interior 114 of the sleeve 110. The deviation from the perfect concentric condition may be less than about 10% of the core size of the double-clad fiber 144. For example, if the fiber core is about 100 microns in diameter, the offset may be controlled within about 10 microns. Under such a configuration, the sleeve 110 provides a self-alignment mechanism for the fiber ferrules 120, 140 and the lens 130 which are aligned automatically along the optic axis of the lens 130 by being placed in the sleeve 110.

The pump coupling lens 130 as shown in FIG. 1 has two end facets 130A and 130B where the facet 130B facing the fiber facet 144A is substantially perpendicular to the longitudinal direction of the fiber 144. The lens 130 may be shaped to have an exterior conforming to the interior of the interior 114 of the sleeve 110 so that the lens 130 can be directly placed in the sleeve 110 between the fiber ferrules 120 and 140. Alternatively, a lens holder may be used to hold the lens 130. The exterior of the lens holder is shaped to conform to the interior 114 of the sleeve 110.

The pump fiber bundle coupler 100 may be configured to meet the following optical conditions to achieve efficient optical coupling from the pump fibers 124 to the double-clad fiber 144. First, the distance between the polished facets of the pump fibers 124 and the lens 130, and the distance between the lens 130 and the end facet 144A of the fiber 144 are selected so that the facets of the pump fibers 124 are imaged onto the end facet 144A of the fiber 144. Secondly, the numerical aperture of the lens 130, which represents the maximum divergence of the pump beam directed by the lens 130 to the fiber 144, should be less than the numerical aperture by of the cladding waveguide formed by the inner cladding and outer cladding layers in the fiber 144. Thirdly, the beam size of the pump beam on the facet 144A of the fiber 144 should not be greater than the cross section of the inner cladding of the fiber 144.

FIG. 4 shows another embodiment 400 of a pump fiber bundle coupler where a lens 410 is used to replace the lens 130. Different from the lens 130 whose end facet 130B substantially perpendicular to the longitudinal direction of the fiber 144, the lens 410 has an end facet 410A facing the fiber facet 144A that is substantially parallel to the angled end facet 144A by forming the same acute angle with respect to the plane perpendicular to the fiber 144 as the fiber end facet 144A. Under this configuration, an beam offset due to optical refraction at the angled facet 142A is reduced and the coupling efficiency can be increased.

The above pump fiber bundle couplers for double-clad fibers have a number of advantages in manufacturing and device performance. For example, the use of the pump fiber ferrule 120 to form the fiber bundle of the pump fibers 124 avoids fusing the pump fibers 124 together which may be a difficult and inconsistent process. The mechanical coupling mechanism by using the sleeve 110 to hold the fiber ferrules 120 and 140 and the lens 130 provides a self-alignment mechanism which essentially eliminates laborious optical alignment. The sleeve structure can also simplify the engagement of the pump fibers 124 to the double-clad fiber 144 so that the pump fiber bundle couplers can be easily manufactured with high reliability and reproducibility.

FIGS. 5A and 5B show exemplary fiber devices 501 and 502 that use a pump fiber bundle coupler 520 based on the design 100 in FIG. 1 or 400 in FIG. 4. The doped double-clad fiber 144 is designed to include a loop 530 for producing stimulated Raman scattering (SRS) or simulated Brillouin scattering (SBS) process when optically pumped by multiple pump lasers 510 at a pump wavelength shorter than the laser emission wavelength. The nonlinear SRS or SBS process in the loop 530 produces frequency down-shifted Stokes signals at wavelengths between the pump wavelength and the laser emission wavelength to convert the pump energy from the pump wavelength to the energy at the laser emission wavelength. See, e.g., U.S. Pat. Nos. 5,323,404, 5,815,518, and 5,966,480.

Both devices 501 and 502 implement cascaded optical resonators for amplifying Stokes signals at different wavelengths and may be used as in either a fiber laser or a fiber amplifier. The device 501 in FIG. 5A implements two sets of in-line wavelength-selective reflectors, 551 and 552 are formed in the fiber 144 on two sides of the loop 530 2 to form optical resonators for amplifying Stokes signals at Stokes wavelengths shorter than the laser emission wavelength. Each reflector set includes wavelength-selective reflectors 551A, 551B, and 551C respectively at different Stokes wavelengths. Fiber Bragg gratings, for example, may be formed in the fiber 144 to operate as such wavelength-selective reflectors. Hence, reflectors 551A form one optical resonator at their respective reflective wavelength; reflectors 551B form another optical resonator that encloses the resonator formed by reflectors 551A; and so on.

The device 501 may optionally include in-line wavelength-selective reflectors 541 and 542 such as fiber Bragg gratings formed in the fiber 144 on two sides of the loop 530 to reflect light at the laser emission wavelength while transmitting other wavelengths. The reflector 542 is partially transmissive at the laser emission wavelength to produce an output. The reflector sets 551 and 552 are located between the reflectors 541 and 542. In addition, an optional pump reflector 560 may be formed in the fiber 144 on the side of the loop 530 where the reflector set 552 is located to reflect light at the pump wavelength and transmit light at other wavelengths. The pump reflector 560 may be, for example, located between the loop 530 and the reflector set 552 as shown or between the reflector set 552 and the reflector 542.

The device 501 in FIG. 5B modifies the device 502 by using a broadband reflector 580 to replace the reflectors 560, 552, and 542. Hence, the multiple cascaded optical resonators at different wavelengths are formed between the reflectors 541, 551 and the reflector 580. A wavelength-selective optical coupler 570 is coupled to the fiber 144 between the loop 530 and the reflector 580 to couple light only at the laser emission wavelength to an output fiber 572.

Although the present disclosure only includes a few embodiments, it is understood that various modifications and enhancements may be made without departing from the following claims.

What is claimed is:

1. A fiber device, comprising:
   a sleeve having an elongated tubular body with an input terminal and an output terminal;
   an input fiber ferrule placed in said sleeve at said input terminal;
   a plurality of pump fibers bundled together at one fiber terminals by said input fiber ferrule to form a pump fiber bundle, wherein end facets of said bundled fiber terminals are polished to form an optical pump coupling surface for outputting pump light from said pump fibers;
   a plurality of lasers respectively coupled to said pump fibers to produce light into each pump fiber;
   an output fiber ferrule placed in said sleeve at said output terminal;
   a double-clad fiber having a fiber core, an inner cladding layer surrounding said fiber core, and an outer cladding layer surrounding said inner cladding layer, said double-clad fiber further including a pump-receiving terminal coupled to said output fiber ferrule to receive said pump light into said inner cladding layer, wherein said double-clad fiber includes a fiber loop in which said fiber core in doped with active ions to produce optical gain;
   a lens disposed in said sleeve between said input and said output fiber ferrules to image said optical pump coupling surface onto said pump-receiving terminal, wherein said lens has a numerical aperture not greater than a numerical aperture of said inner cladding layer;
   a first set of wavelength-selective reflectors formed in said double-clad fiber between said pump-receiving terminal and said fiber loop, each reflector operable to reflect light at a selected wavelength while transmitting light at other wavelengths; and
   a second set of wavelength-selective reflectors formed in said double-clad fiber on a side of said fiber loop opposite to said first set of wavelength-selective reflectors, each reflector operable to reflect light at a selected wavelength while transmitting light at other wavelengths.

2. The device as in claim 1, wherein said pump-receiving terminal has an end facet that forms an acute angle with respect to a plane perpendicular to a longitudinal direction of said double-clad fiber.

3. The device as in claim 2, wherein said lens includes an optical output surface facing said pump-receiving terminal which is substantially parallel to said end facet of said pump-receiving terminal.

4. The device as in claim 1, wherein a center of said pump fibers, a center of said lens, and said fiber core of said double-clad fiber are substantially aligned along an optic axis of said lens.

5. The device as in claim 1, wherein exteriors of said input and said output fiber ferrules, and said lens conform to an interior of said sleeve.

6. The device as in claim 1, wherein said lens includes a GRIN lens.

7. The device as in claim 1, wherein said lens in configured to couple said pump light to said pump-receiving terminal with a beam spot not greater than a spatial extent of said inner cladding layer.

8. The device as in claim 1, wherein said sleeve includes a slit formed from said input terminal to said output terminal along a longitudinal direction of said sleeve.

9. The device as in claim 1, wherein said sleeve is formed of Zorconia or Phosphor Bronze.

10. The device as in claim 1, wherein each fiber ferrule includes a glass, quartz, a metal, or a ceramic.

11. A fiber device, comprising:
a sleeve having an elongated tubular body with an input terminal and an output terminal;
an input fiber ferrule placed in said sleeve at said input terminal;
a plurality of pump fibers bundled together at one fiber terminals by said input fiber ferrule to form a pump fiber bundle, wherein end facets of said bundled fiber terminals are polished to form an optical pump coupling surface for outputting pump light from said pump fiber;
a plurality of lasers respectively coupled to said pump fibers to produce light into each pump fiber;
an output fiber ferrule placed in said sleeve at said output terminal;
a double-clad fiber having a fiber core, an inner cladding layer surrounding said fiber core, and an outer cladding layer surrounding said inner cladding layer, said double-clad fiber further including a pump-receiving terminal coupled to said output fiber ferrule to receive said pump light into said inner cladding layer, wherein said double-clad fiber includes a fiber loop in which said fiber core in doped with active ion to produce optical gain;
a lens disposed in said sleeve between said input and said output fiber ferrules to image said optical pump coupling surface onto said pump-receiving terminal, wherein amid lens has a numerical aperture not greater than a numerical aperture of said inner cladding layer;
a first set of wavelength-selective reflectors formed in said double-clad fiber between said pump-receiving terminal and said fiber loop, each reflector operable to reflect light at a selected wavelength while transmitting light at other wavelengths;
a broadband reflector formed in said double-clad fiber on a side of said fiber loop opposite to said first set of wavelength-selective reflectors and operable to reflect each selected wavelength of each reflector in said first set of wavelength-selective reflectors; and
an optical coupler coupled between said broadband reflector and said fiber loop to produce an optical output at a selected laser wavelength.

12. A fiber device, comprising:
a sleeve having an elongated tubular body with a cylindrical interior;
an input fiber ferrule having a cylindrical exterior substantially conforming to said cylindrical interior of said sleeve and placed within said sleeve;
a plurality of pump fibers having fiber terminals bundled together by said input fiber ferrule to form a pump fiber bundle to deliver pump light into said sleeve;
an output fiber ferrule having a cylindrical exterior substantially conforming to said cylindrical interior of said sleeve and placed within said sleeve and spaced from said input fiber ferrule;
a double-clad fiber having a fiber core, an inner cladding layer surrounding said fiber core, and an outer cladding layer surrounding said inner cladding layer, and engaged to said output fiber ferrule to receive said pump light into said inner cladding layer; and
a lens disposed in said sleeve between said input and said output fiber ferrules to have a lens optic axis substantially aligned with a center of said pump fibers and said fiber core of said double-clad fiber, wherein said lens has a numerical aperture not greater than a numerical aperture of said inner cladding layer and said lens in spaced from said input and said output fiber ferrules to image end facet of said pump fibers to an end facet of paid double-clad fiber.

13. The device as in claim 12, wherein said lens has an output lens surface facing said output fiber ferrule that is parallel to an end facet of said double-clad fiber, wherein both said output lens surface and said end facet form an acute angle with respect to a plane substantially perpendicular to said lens optic axis.

14. The device as in claim 11, wherein said pump-receiving terminal has an end facet that forms an acute angle with respect to a plane perpendicular to a longitudinal direction of said double-clad fiber.

15. The device as in claim 14, wherein said lens includes an optical output surface facing said pump-receiving terminal which is substantially parallel to said end facet of said pump-receiving terminal.

16. The device as in claim 11, wherein said lens includes a GRIN lens.

17. The device as in claim 11, wherein said lens is configured to couple said pump light to said pump-receiving terminal with a beam spot not greater than a spatial extent of said inner cladding layer.

18. The device as in claim 11, wherein said sleeve includes a alit formed from said input terminal to said output terminal along a longitudinal direction of said sleeve.

19. The device as in claim 11, wherein said sleeve includes a material of Zorconia or Phosphor Bronze.

20. The device as in claim 11, wherein each fiber ferrule includes one material selected from a group consisting of a glass, quartz, a metal, and a ceramic.

21. The device as in claim 11, wherein a reflector in said first set of wavelength-selective reflectors is a fiber Bragg grating formed in said double-clad fiber.

22. The device as in claim 1, wherein a reflector in said first set of wavelength-selective reflectors is a fiber Bragg grating formed in said double-clad fiber.

23. The device as in claim 1, wherein a reflector in said second set of wavelength-selective reflectors is a fiber Bragg grating formed in said double-clad fiber.

24. The device as in claim 1, wherein each of said wavelength-selective reflectors in said first and said second sets is a fiber Bragg grating formed in said double-clad fiber.

* * * * *